Patented May 22, 1928.

1,670,980

UNITED STATES PATENT OFFICE.

GÖSTA OSVALD, OF STOCKHOLM, SWEDEN, ASSIGNOR TO WINTHROP CHEMICAL COMPANY, INC., OF NEW YORK, N. Y.

METHOD OF DISINFECTING SEEDS.

No Drawing. Application filed November 14, 1925, Serial No. 69,172, and in Sweden January 26, 1925.

This invention relates to an improved method of disinfecting seed by the dry process, i. e. without the use of disinfecting aqueous solutions wherein the seed must be soaked. The dust disinfectants hitherto proposed are subject to the disadvantage that they generally are more or less poisonous and consequently may be injurious to the person who effects the disinfection since the poisonous dust easily penetrates into the respiratory organs if special protecting measures are not taken.

The object of this invention is to avoid said disadvantage by the use of a non-poisonous disinfecting substance. The invention consists chiefly, in covering the seed grains with a coating of a compound containing polymeric formaldehyde such as paraformaldehyde, trioxymethylene, polyoxymethylenes as a disinfecting substance intimately mixed with other more or less inactive substances.

As diluting inactive substance I prefer to use finely divided talc but also magnesia, iron oxide, siliceous earth and other finely divided substances which can be uniformly mixed with the active agent and retain it may be used. The percentage of polymeric formaldehyde in the mixture ought not be too large inasmuch as the compound then easily injures the power of germination of the seed. It should, therefore, be less than 10 percent by weight and is preferably chosen between 2 and 7 percent by weight while the remainder consists of inactive diluting substances.

*Example 1.*—1000 grams of finely divided talc is mixed with 150 grams of a 40% solution of formaldehyde whereupon the mixture is dried until a practically dry powder is obtained. In the drying operation chiefly water is removed and the greater part of the formaldehyde is separated as paraformaldehyde which uniformly impregnates the talc.

*Example 2.*—1000 grams of finely divided talc is intimately mixed with 40 to 50 grams of paraformaldehyde in solid state.

In performing the disinfection of the seed a barrel made of wood or iron may be used in which the seed together with a suitable quantity of the dust disinfectant is placed, preferably 300 to 500 grams of the latter to 100 kgs. of the seed to be treated whereupon the barrel is closed and the contents thoroughly mixed by rolling and tilting the barrel. For the application of the dust treatment to large quantities of seed it is preferable to use rotatably journaled mixers of the barrel type with tight cover. In the dust treatment the single grains are covered with an efficient protective coating of the fine disinfectant. After the finishing of said treatment the seed is ready to be sown. When the seed has been planted the paraformaldehyde is gradually dissolved by the moisture of the ground and thus kills all injurious spores and other injurious disease germs on the grains and in the soil in the immediate proximity of the grains without injuring the germinating power of the grains.

What I claim is:

1. A method for protecting seed from injurious fungi, which comprises dusting the seed with a finely divided dry material containing about two to ten per cent of polymeric formaldehyde, said material being disassociated by the conditions normally obtaining in the soil.

2. A method of disinfecting seed, which comprises dusting the seed with a finely divided dry material containing an inert ingredient in admixture with about two to ten per cent polymeric formaldehyde.

3. A method of disinfecting seed, which comprises dusting the seed with a finely divided dry material containing talc in admixture with about two to ten per cent polymeric formaldehyde.

In testimony whereof I have signed my name.

GÖSTA OSVALD.